US011715850B2

(12) United States Patent
Saul, II et al.

(10) Patent No.: US 11,715,850 B2
(45) Date of Patent: Aug. 1, 2023

(54) BATTERY THERMAL MANAGEMENT SYSTEM

(71) Applicant: Genovation Cars, Inc., Rockville, MD (US)

(72) Inventors: Andrew Maguire Saul, II, Rockville, MD (US); Robert Irby, III, Washington, DC (US); Steve Rogers, Sarasota, FL (US); Raymond A. Peters, White Lake, MI (US)

(73) Assignee: Genovation Cars, Inc., Rockville, MD (US)

( * ) Notice: Subject to any disclaimer, the term of this patent is extended or adjusted under 35 U.S.C. 154(b) by 0 days.

(21) Appl. No.: 17/697,589

(22) Filed: Mar. 17, 2022

(65) Prior Publication Data
US 2022/0302518 A1 Sep. 22, 2022

Related U.S. Application Data

(60) Provisional application No. 63/162,296, filed on Mar. 17, 2021.

(51) Int. Cl.
| | |
|---|---|
| *H01M 10/625* | (2014.01) |
| *H01M 10/613* | (2014.01) |
| *H01M 10/6556* | (2014.01) |
| *B60L 58/26* | (2019.01) |
| *H01M 10/6568* | (2014.01) |

(Continued)

(52) U.S. Cl.
CPC ........... *H01M 10/625* (2015.04); *B60L 50/64* (2019.02); *B60L 58/24* (2019.02); *B60L 58/26* (2019.02); *H01M 10/0525* (2013.01); *H01M 10/613* (2015.04); *H01M 10/653* (2015.04); *H01M 10/6551* (2015.04); *H01M 10/6556* (2015.04); *H01M 10/6568* (2015.04);

(Continued)

(58) Field of Classification Search
CPC ........... H01M 10/625; H01M 10/0525; H01M 10/613; H01M 10/653; H01M 10/6556; H01M 10/6568; H01M 50/121; H01M 50/1245; H01M 50/131; H01M 2220/20; H01M 10/643; H01M 50/213; H01M 50/249; B60L 50/64; B60L 58/24; B60L 58/26; B60L 2240/545; B60L 7/10; B60L 50/66
USPC .......................................................... 429/120
See application file for complete search history.

(56) References Cited

U.S. PATENT DOCUMENTS

| | | | |
|---|---|---|---|
| 11,088,401 B1 * | 8/2021 | Tarfaoui | ............. H01M 50/249 |
| 2022/0209330 A1 | 6/2022 | Walter et al. | |

FOREIGN PATENT DOCUMENTS

TW 1565125 B 1/2017

OTHER PUBLICATIONS

Non-Final Office Action issued in related U.S. Appl. No. 17/697,611 dated Aug. 2, 2022.

(Continued)

*Primary Examiner* — Gary D Harris
(74) *Attorney, Agent, or Firm* — Brian J. Colandreo; Jeffery T. Placker; Holland & Knight LLP (57) ABSTRACT

A battery cell thermal management assembly includes: a body structure including a plurality of cell-shaped recesses configured to receive a plurality of battery cells; and a thermal management passage positioned within the body structure and configured to circulate a thermal management fluid to extract internally-generated thermal energy from the plurality of battery cells.

12 Claims, 6 Drawing Sheets

(51) Int. Cl.
*H01M 10/653* (2014.01)
*H01M 10/6551* (2014.01)
*B60L 50/64* (2019.01)
*B60L 58/24* (2019.01)
*H01M 50/131* (2021.01)
*H01M 50/121* (2021.01)
*H01M 50/124* (2021.01)
*H01M 10/0525* (2010.01)

(52) U.S. Cl.
CPC ..... *H01M 50/121* (2021.01); *H01M 50/1245* (2021.01); *H01M 50/131* (2021.01); *H01M 2220/20* (2013.01)

(56) References Cited

OTHER PUBLICATIONS

Final Office Action issued in related U.S. Appl. No. 17/697,611 dated Jun. 14, 2023.

\* cited by examiner

BATTERY THERMAL MANAGEMENT SYSTEM

RELATED APPLICATION(S)

This application claims the benefit of U.S. Provisional Application No. 63/162,296, filed on 17 Mar. 2021, the entire contents of which are incorporated herein by reference.

TECHNICAL FIELD

This disclosure relates generally to battery systems, and more particularly to battery systems for use within electric vehicles.

BACKGROUND

Over the past couple of decades, electric cars have moved from a far-fetched fantasy to a viable alternative to fossil-fueled vehicles. Specifically, advancements in battery technology have enabled for (somewhat) rapid charging of the battery packs that power these electric vehicles.

Additionally and due to companies like Tesla™, electric vehicles have transitioned from low-performance econo-boxes to high-performance sports cars. In order to enable such higher levels of performance, the battery packs that power these electric vehicles must be capable of providing the requisite level of kilowatts required to achieve the desired performance.

Unfortunately, the levels of current required from these battery packs to achieve such performance (often over 500 amps) may generate considerable heat within these battery packs, wherein this heat must be removed to prevent premature failure of the same.

SUMMARY OF DISCLOSURE

Thermal Management Assembly

In one implementation, a battery cell thermal management assembly includes: a body structure including a plurality of cell-shaped recesses configured to receive a plurality of battery cells; and a thermal management passage positioned within the body structure and configured to circulate a thermal management fluid to extract internally-generated thermal energy from the plurality of battery cells.

One or more of the following features may be included. The one or more of the plurality of cell-shaped recesses may be configured to at least partially encapsulate one or more of the plurality of battery cells. The one or more of the plurality of cell-shaped recesses may be configured to fully encapsulate one or more of the plurality of battery cells. The one or more of the plurality of cell-shaped recesses may be a radiused trough configured to accommodate one or more cylindrical-shaped battery cells. The one or more of the plurality of cell-shaped recesses may be a flat-bottomed trough configured to accommodate one or more flat-bottomed battery cells. The thermal management passage may include one or more circulation tubes positioned within the body structure. The thermal management passage may include one or more circulation passages defined within the body structure. The thermal management passage may be configured to interface with a fluid circulation system configured to circulate the thermal management fluid and extract the internally-generated thermal energy therefrom. The body structure may be constructed of a thermally-conductive metallic material. The body structure may be constructed of a thermally-conductive plastic material. The thermal management fluid may include one or more of: a glycol-based fluid, a water-based fluid, and a silicone-based fluid. A phase change material may be positioned within the body structure and may be configured to transfer the internally-generated thermal energy from the plurality of battery cells to the thermal management fluid. A thermally-conductive material may be positioned within the body structure and may be configured to transfer the internally-generated thermal energy from the plurality of battery cells to the thermal management fluid.

In another implementation, a battery cell thermal management assembly includes: a body structure including a plurality of cell-shaped recesses configured to receive a plurality of battery cells, wherein: one or more of the plurality of cell-shaped recesses is configured to at least partially encapsulate one or more of the plurality of battery cells, and one or more of the plurality of cell-shaped recesses is a radiused trough configured to accommodate one or more cylindrical-shaped battery cells; and a thermal management passage positioned within the body structure and configured to circulate a thermal management fluid to extract internally-generated thermal energy from the plurality of battery cells.

One or more of the following features may be included. The thermal management passage may include one or more circulation tubes positioned within the body structure. The thermal management passage may include one or more circulation passages defined within the body structure. The body structure may be constructed of a thermally-conductive metallic material. The body structure may be constructed of a thermally-conductive plastic material. The thermal management fluid may include one or more of: a glycol-based fluid, a water-based fluid, and a silicone-based fluid. A phase change material may be positioned within the body structure and configured to transfer the internally-generated thermal energy from the plurality of battery cells to the thermal management fluid. A thermally-conductive material may be positioned within the body structure and configured to transfer the internally-generated thermal energy from the plurality of battery cells to the thermal management fluid.

In another implementation, a battery cell thermal management assembly includes: a body structure including a plurality of cell-shaped recesses configured to receive a plurality of battery cells, wherein: one or more of the plurality of cell-shaped recesses is configured to at least partially encapsulate one or more of the plurality of battery cells, and one or more of the plurality of cell-shaped recesses is a radiused trough configured to accommodate one or more cylindrical-shaped battery cells; and a thermal management passage positioned within the body structure and configured to circulate a thermal management fluid to extract the internally-generated thermal energy from the plurality of battery cells, wherein: the thermal management passage includes one or more circulation passages defined within the body structure, and the thermal management passage is configured to interface with a fluid circulation system configured to circulate the thermal management fluid and extract the internally-generated thermal energy therefrom.

One or more of the following features may be included. The body structure may be constructed of a thermally-conductive metallic material. The body structure may be constructed of a thermally-conductive plastic material. The thermal management fluid may include one or more of: a glycol-based fluid, a water-based fluid, and a silicone-based fluid.

The details of one or more implementations are set forth in the accompanying drawings and the description below.

BRIEF DESCRIPTION OF THE DRAWINGS

Like reference symbols in the various drawings indicate like elements.

DETAILED DESCRIPTION OF THE PREFERRED EMBODIMENTS

Figure 1:
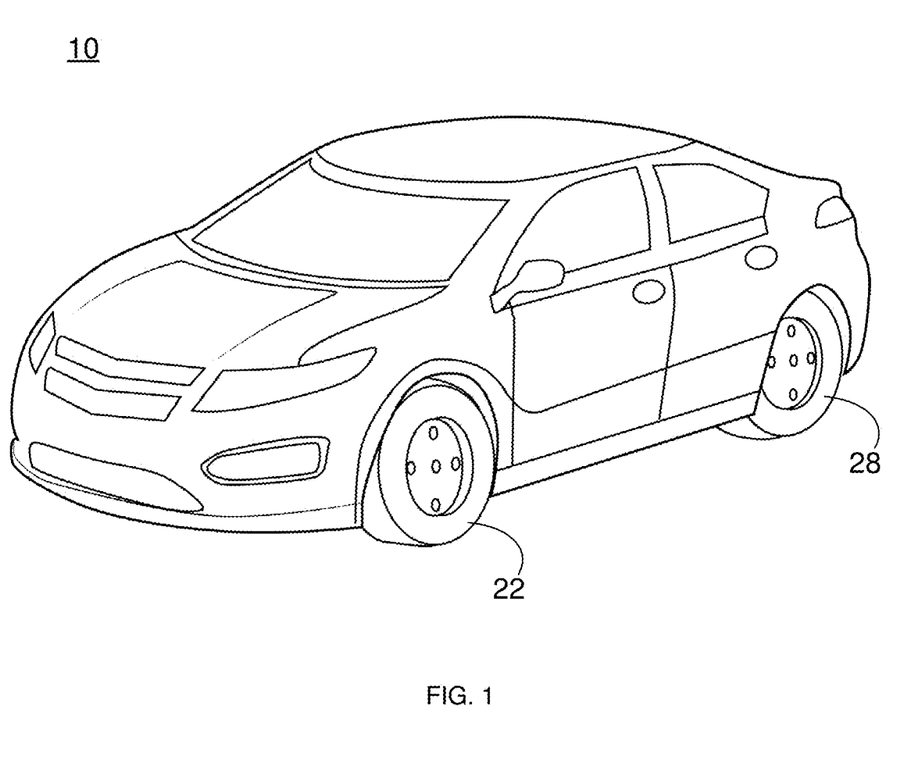
FIG. 1 is a diagrammatic view of an electric vehicle.
Figure 2:
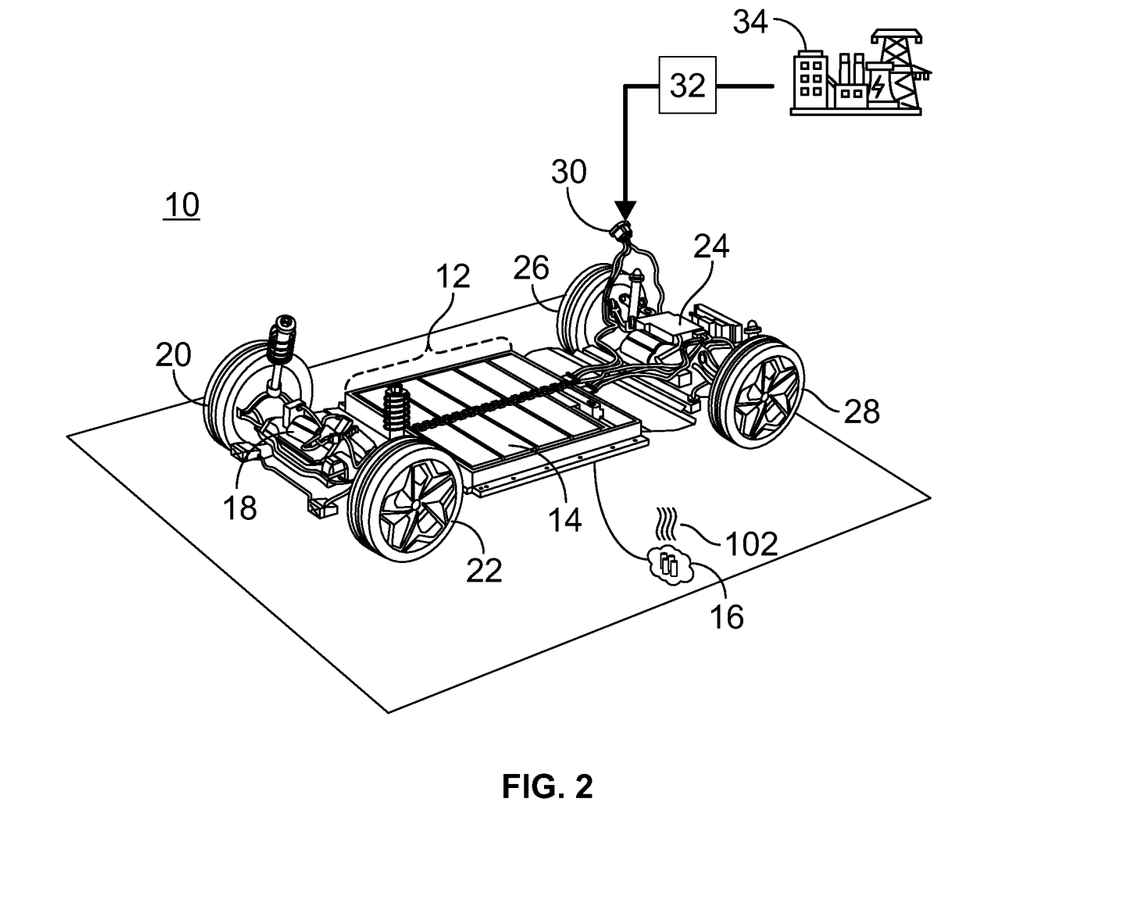
FIG. 2 is another diagrammatic of the electric vehicle of FIG. 1.

Referring to FIGS. 1-2, there is shown electric vehicle 10. Electric vehicle 10 may include battery pack 12 that is configured to provide the electrical energy required for electric vehicle 10 to accelerate and move. Battery pack 12 may include a plurality of battery modules (e.g., battery module 14), each of which may include many (e.g., hundreds) of discrete battery cells (e.g., battery cells 16). Examples of such battery cells (e.g., battery cells 16) may include but are not limited to lithium-ion battery cells that have a voltage potential of 3.2-4.2 VDC. Battery pack 12 may include many thousands of such battery cells (e.g., battery cells 16).

Electric vehicle 10 may include a propulsion system to provide such acceleration/movement. For example, electric vehicle 10 may include front propulsion system (e.g., electric motor 18) to provide rotational energy to front drive wheels 20, 22 and/or rear propulsion system (e.g., electric motor 24) to provide rotational energy to rear drive wheels 26, 28.

Electric vehicle 10 may include charging port 30 that may allow for the charging of battery pack 12 via charging station 32 that is coupled to municipal power source 34.

Thermal Management Assembly

As discussed above, electric vehicles (e.g., electrical vehicle 10) have transitioned from low-performance econoboxes to high-performance sports cars, wherein the battery packs (e.g., battery pack 12) that power these electric vehicles (e.g., electrical vehicle 10) must be capable of providing the requisite level of kilowatts required to achieve the desired performance. Unfortunately, the levels of current required from these battery packs (e.g., battery pack 12) to achieve such performance (often over 500 amps) may generate considerable heat within these battery packs (e.g., battery pack 12), wherein this heat must be removed to prevent premature failure of the same.

Figure 3:
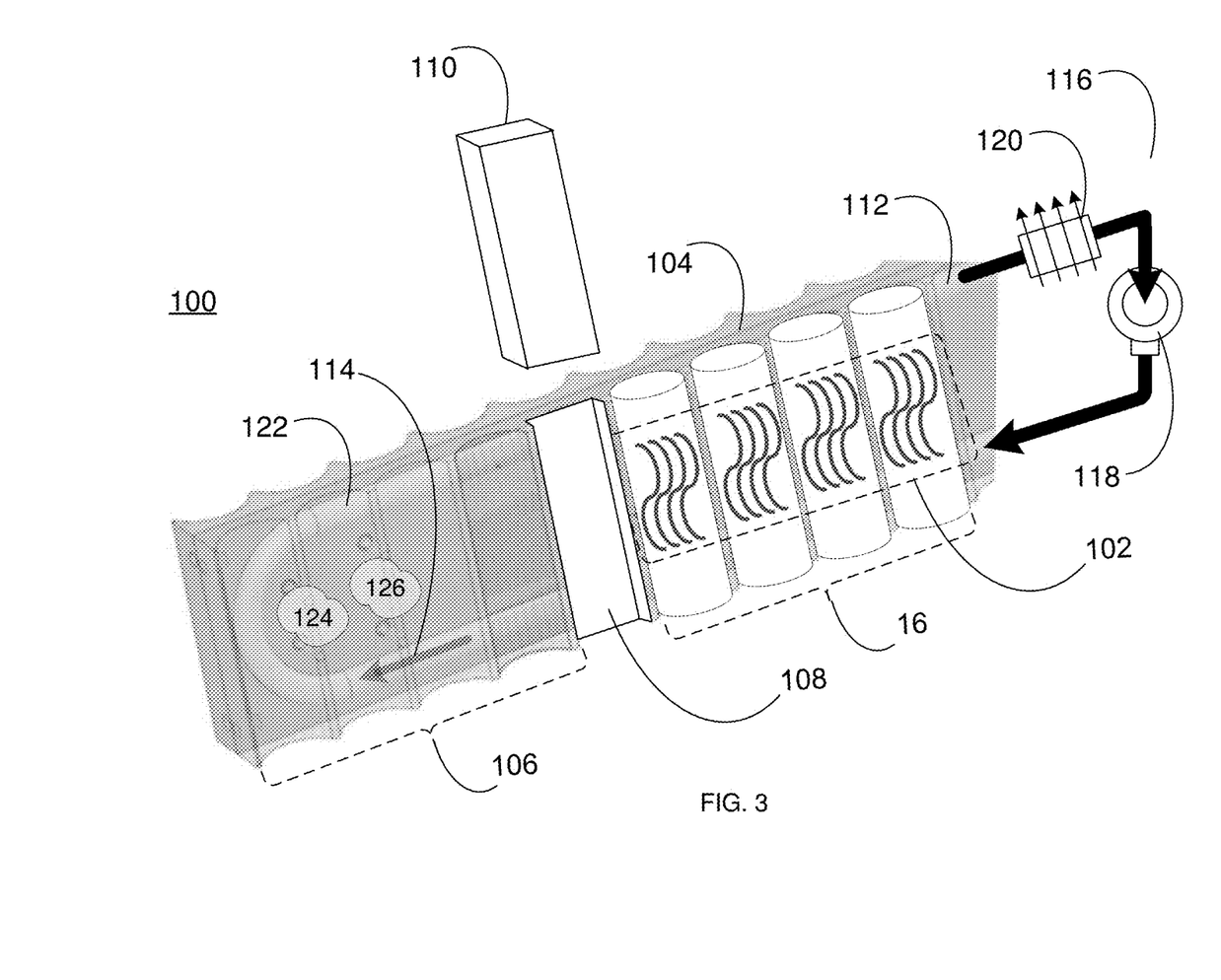
FIG. 3 is a diagrammatic view of a battery cell thermal management assembly for use in the electric vehicle of FIG. 1 according to an embodiment of the present disclosure.

Referring also to FIG. 3, these battery packs (e.g., battery pack 12) may be cooled via battery cell thermal management assembly 100. As discussed above, battery pack 12 may include a plurality of battery modules (e.g., battery module 14), each of which may include many (e.g., hundreds) of discrete battery cells (e.g., battery cells 16). As will be discussed below in greater detail, battery cell thermal management assembly 100 may be positioned proximate these discrete battery cells (e.g., battery cells 16) to extract internally-generated thermal energy (e.g., internally generated thermal energy 102). This internally-generated thermal energy (e.g., internally generated thermal energy 102) may be generated when charging the battery cell (e.g., battery cells 16 and/or battery pack 12) and/or when discharging the battery cell (e.g., battery cells 16 and/or battery pack 12).

Battery cell thermal management assembly 100 may include a body structure (e.g., body structure 104), wherein the body structure (e.g., body structure 104) may include a plurality of cell-shaped recesses (e.g., cell-shaped recesses 106) configured to receive a plurality of battery cells (e.g., battery cells 16).

In this particular example, plurality of battery cells (e.g., battery cells 16) are shown to be cylindrically-shaped battery cells (e.g., similar to a AA or AAA battery). Accordingly and in such a configuration, the plurality of cell-shaped recesses (e.g., cell-shaped recesses 106) are shown to be a radiused trough configured to accommodate one or more cylindrically-shaped battery cells (e.g., battery cells 16).

However, it is understood that this is just for illustrative purpose only and is not intended to be a limitation of this disclosure, as other battery cell/recess configurations are possible and are considered to be within the scope of this disclosure. For example, one or more of the plurality of cell-shaped recesses may be a flat-bottomed trough (e.g., cell-shaped recess 108) configured to accommodate one or more flat-bottomed battery cells (e.g., battery cell 110).

As shown in FIG. 3, one or more of the plurality of cell-shaped recesses (e.g., cell-shaped recesses 106, 108) may be configured to at least partially encapsulate one or more of the plurality of battery cells (e.g., battery cells 16, 110). For example, cell-shaped recesses (e.g., cell-shaped recesses 106) are shown (in this example) to encapsulate more than 135° of the circumference/periphery of the cylindrical battery cells (e.g., battery cells 16) but less than 180° of the circumference/periphery of the cylindrical battery cells (e.g., battery cells 16).

Figure 4:
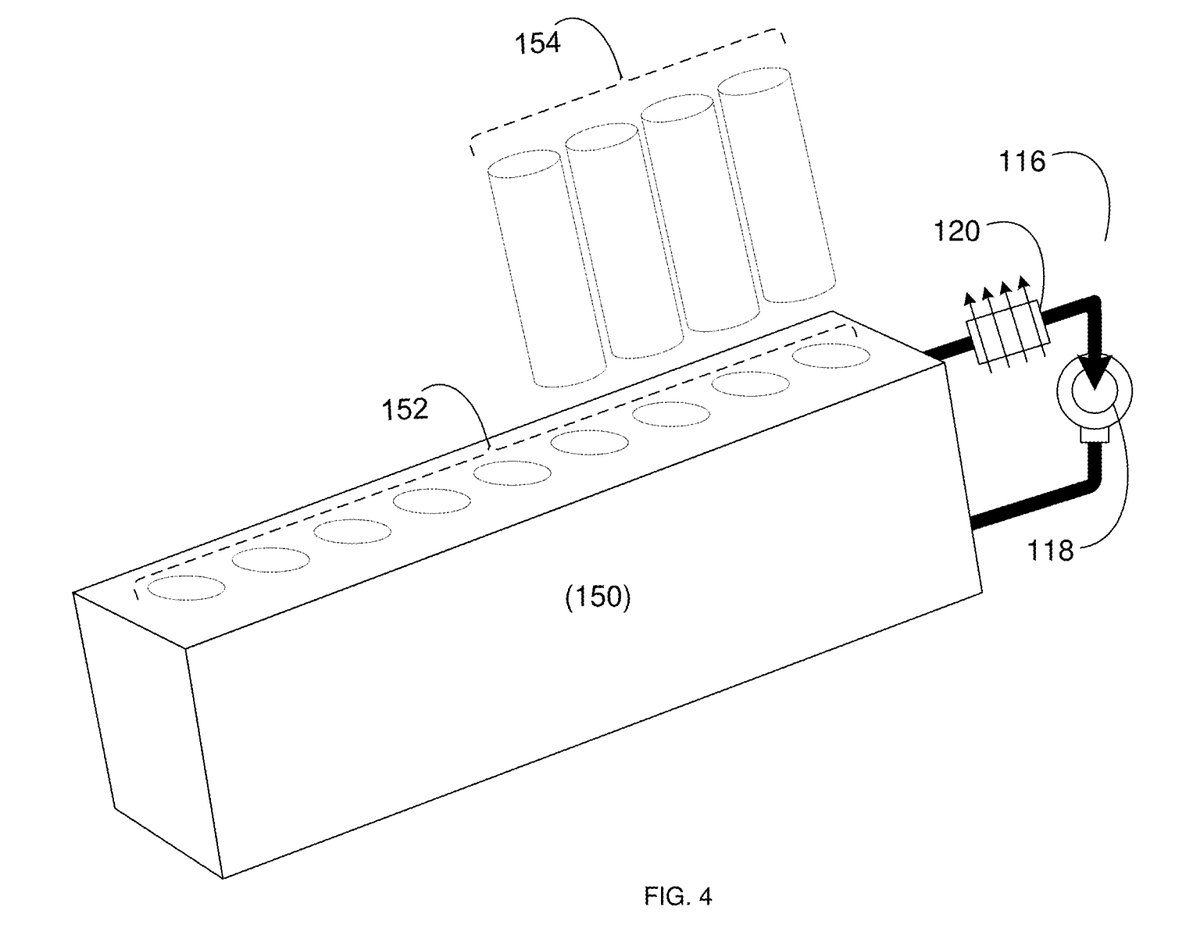
FIG. 4 is a diagrammatic view of another embodiment of the battery cell thermal management assembly of FIG. 3 according to an embodiment of the present disclosure.

Additionally/alternatively, one or more of the plurality of cell-shaped recesses (e.g., cell-shaped recesses 106, 108) may be configured to fully encapsulate one or more of the plurality of battery cells (e.g., battery cells 16, 110). For example, a pair of "partial-encapsulation" body structures (e.g., body structure 104) may be positioned in parallel to fully encapsulate the plurality of battery cells (e.g., battery cells 16, 110). Additionally/alternatively and as shown in FIG. 4, a "full-encapsulation" body structure (e.g., body structure 150) may be utilized that includes a plurality of (in this example) cell-shaped recesses 152 that form cylindrical passages into which the plurality of battery cells (e.g., battery cells 154) may be inserted.

The body structure (e.g., body structure 104) may be constructed of a thermally-conductive metallic material, examples of which may include but are not limited to stamped stainless steel, stamped aluminum and cast aluminum. Additionally/alternatively, the body structure (e.g., body structure 104) may be constructed of a thermally-conductive plastic material, an example of which may include but is not limited to a thermal-epoxy impregnated carbon fiber.

Battery cell thermal management assembly 100 may include a thermal management passage (e.g., thermal management passage 112) positioned within the body structure (e.g., body structure 104) and configured to circulate a thermal management fluid (e.g., thermal management fluid 114) to extract internally-generated thermal energy (e.g., internally generated thermal energy 102) from the plurality of battery cells (e.g., battery cells 16, 110). Examples of the thermal management fluid (e.g., thermal management fluid 114) may include but are not limited to one or more of: a glycol-based fluid, a water-based fluid, an oil-based fluid, and a silicone-based fluid.

The thermal management passage (e.g., thermal management passage 112) may be configured to interface with a fluid circulation system (e.g., fluid circulation system 116) configured to circulate the thermal management fluid (e.g., thermal management fluid 114) and extract the internally-generated thermal energy (e.g., internally generated thermal energy 102) therefrom. For example, the fluid circulation system (e.g., fluid circulation system 116) may include a circulation pump (e.g., circulation pump 118) configured to circulate the thermal management fluid (e.g., thermal management fluid 114) within battery cell thermal management assembly 100, wherein fluid circulation system 116 may include a heat exchanger (e.g., heat exchanger 120) to remove the internally-generated thermal energy (e.g., internally generated thermal energy 102) from the thermal management fluid (e.g., thermal management fluid 114).

One example of the thermal management passage (e.g., thermal management passage 112) may include one or more circulation tubes (e.g., circulation tubes 122) positioned within the body structure (e.g., body structure 104). For example, the body structure (e.g., body structure 104) may be hollow (e.g., a hollow shell formed of stamped stainless steel, stamped aluminum, cast aluminum and/or thermal-epoxy impregnated carbon fiber) within which one or more circulation tubes (e.g., circulation tubes 122) may be positioned that allow for the circulation of the thermal management fluid (e.g., thermal management fluid 114) to extract the internally-generated thermal energy (e.g., internally generated thermal energy 102) from the plurality of battery cells (e.g., battery cells 16, 110).

In such a configuration, a phase change material (e.g., phase change material 124) and/or a thermally-conductive material (e.g., thermally-conductive material 126) may be positioned within the body structure (e.g., body structure 104) and may be configured to transfer the internally-generated thermal energy (e.g., internally generated thermal energy 102) from the plurality of battery cells (e.g., battery cells 16, 110) to the thermal management fluid (e.g., thermal management fluid 114).

For example, phase change material 124 (e.g., paraffin wax) and/or thermally-conductive material 126 (e.g., a thermally-conductive epoxy) may be positioned within the body structure (e.g., body structure 104) to fill any gaps within the shell of body structure 104 (e.g., to fill any gaps between the outer surface of body structure 104 and circulation tubes 122) to allow for the conductive transfer of the internally-generated thermal energy (e.g., internally generated thermal energy 102) from the plurality of battery cells (e.g., battery cells 16, 110) to the thermal management fluid (e.g., thermal management fluid 114).

Figure 5:
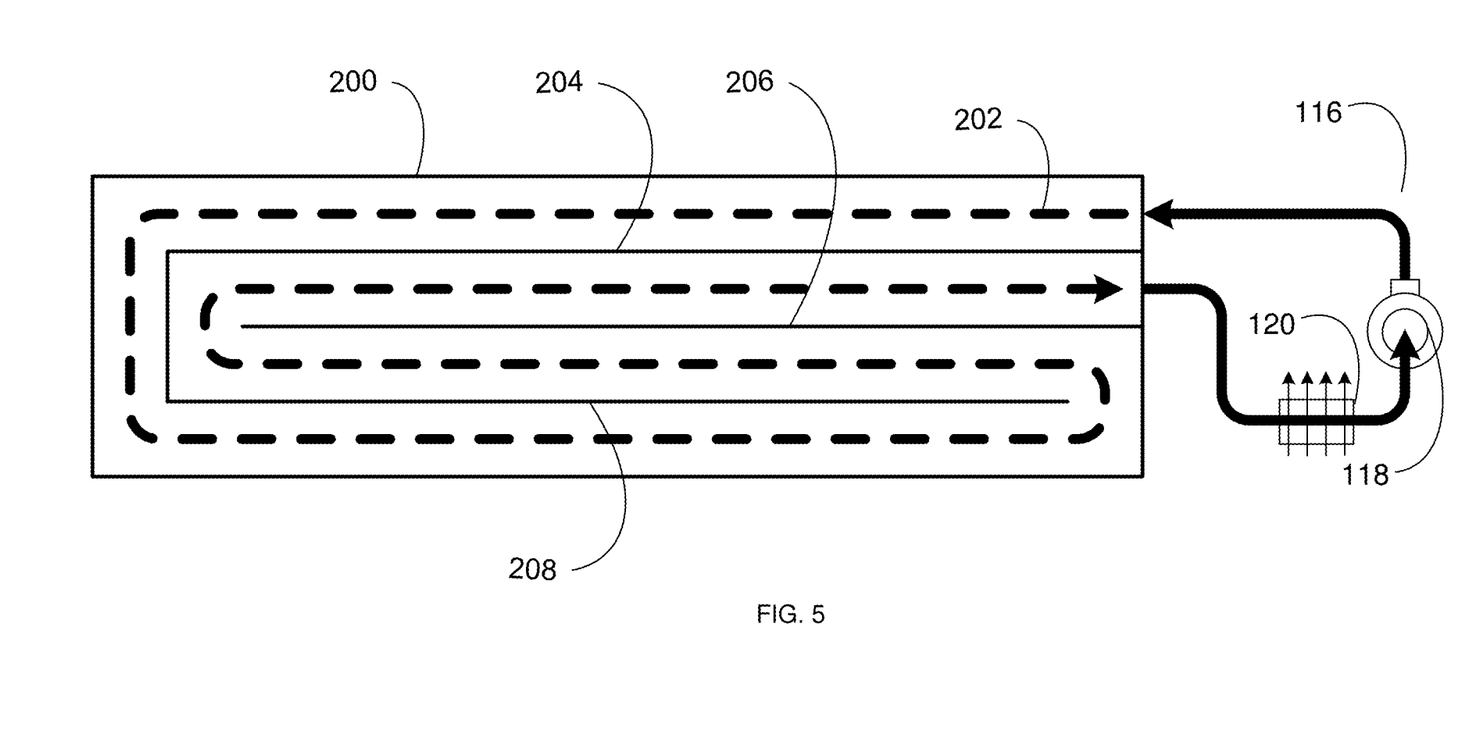
FIG. 5 is a diagrammatic view of another embodiment of the battery cell thermal management assembly of FIG. 3 according to an embodiment of the present disclosure.

Another example of the thermal management passage (e.g., thermal management passage 112) may include one or more circulation passages defined within the body structure (e.g., body structure 104). As discussed above and referring also to FIG. 5, the body structure (e.g., body structure 200) may be hollow (e.g., a hollow shell formed of stamped stainless steel, stamped aluminum, cast aluminum and/or thermal-epoxy impregnated carbon fiber) within which one or more circulation passages (e.g., circulation path 202) may be defined via e.g., baffles 204, 206, 208.

While battery cell thermal management assembly 100 is described above as being utilized to extract heat from the plurality of battery cells (e.g., battery cells 16, 110), battery cell thermal management assembly 100 may also be utilized to actually provide heat to the plurality of battery cells (e.g., battery cells 16, 110). For example, there are situations in which the plurality of battery cells (e.g., battery cells 16, 110) may be below their desired operating temperature, examples of which may include but are not limited to when electric vehicle 10 is stored outside or in an unheated space or when a higher level of performance is needed (e.g., during launch mode operation). In such a situation, battery cell thermal management assembly 100 may be utilized to provide thermal energy to the plurality of battery cells (e.g., battery cells 16, 110). For example, the heat exchanger (e.g., heat exchanger 120) may be configured to introduce thermal energy into thermal management fluid (e.g., thermal management fluid 114), thus allowing thermal management fluid 114 and battery cell thermal management assembly 100 to warm the plurality of battery cells (e.g., battery cells 16, 110) to a desired operating temperature.

Battery Cell

Figures 6, 7:
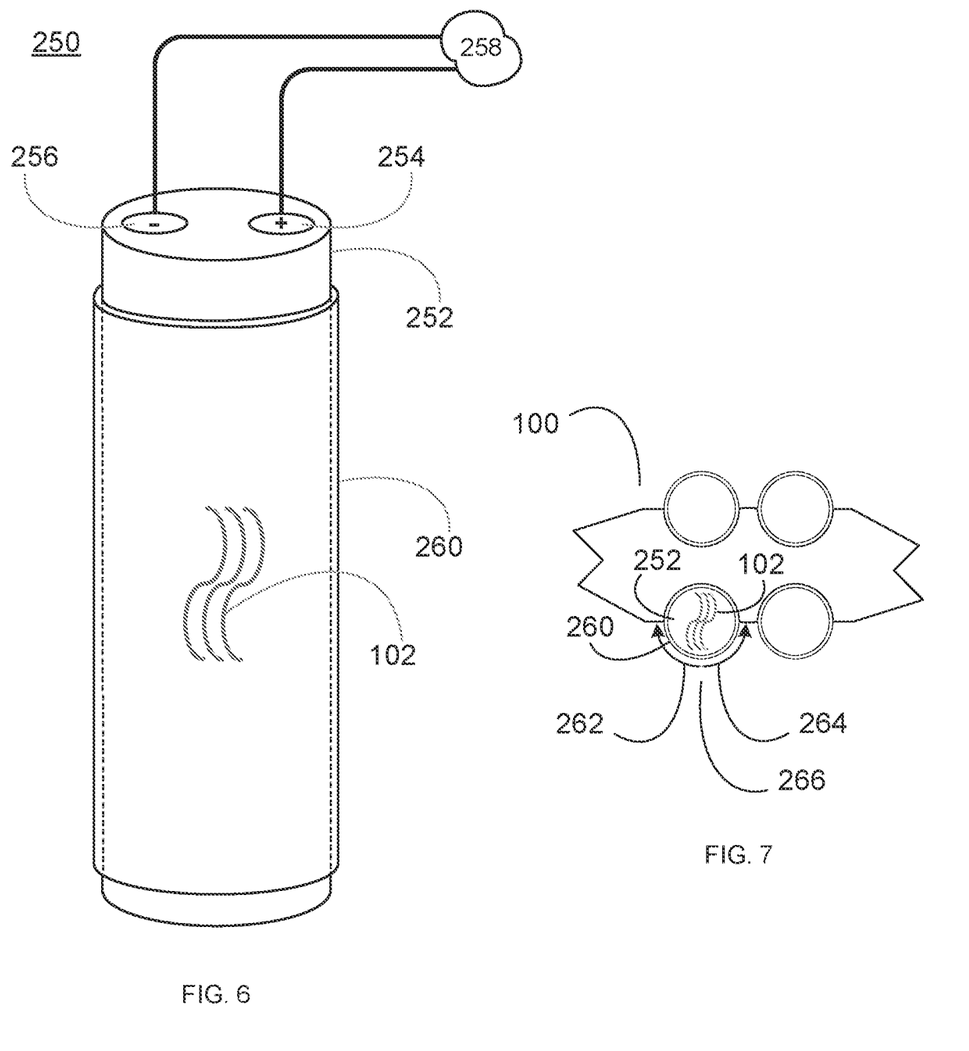
FIG. 6 is a diagrammatic view of a thermally-conductive battery cell for use in the electric vehicle of FIG. 1 according to an embodiment of the present disclosure.
FIG. 7 is a top view of the thermally-conductive battery cell of FIG. 6 according to an embodiment of the present disclosure.

Referring also to FIG. 6, the above-referenced plurality of battery cells (e.g., battery cells 16, 110) may include a plurality of thermally-conductive battery cells (e.g., thermally-conductive battery cell 250).

Thermally-conductive battery cell 250 may include a battery cell (e.g., battery cell 252) including two or more terminals (e.g., terminals 254, 256) that is configured to store electrical energy (e.g., electrical energy 258). The two or more terminals (e.g., terminals 254, 256) may be configured to receive electrical energy 258 (e.g., during regenerative braking and/or from charging port 30 during a charging cycle) and/or provide electrical energy 258 to the front propulsion system (e.g., electric motor 18) and/or the rear propulsion system (e.g., electric motor 24) during use of electric vehicle 10. While terminals 254, 256 are shown to be positioned on the top of thermally-conductive battery cell 250, this is for illustrative purposes only and is not intended to be a limitation of this disclosure, as other configurations are possible and are considered to be within the scope of this disclosure. For example, one or more of terminals 254, 256 may be positioned on the bottom and/or the side of thermally-conductive battery cell 250.

Referring also to FIG. 7, thermally-conductive battery cell 250 may also include a thermally-conductive surface (e.g., thermally-conductive surface 260) positioned about at least a portion of the periphery of the battery cell (e.g., battery cell 252) and configured to allow internally-generated thermal energy (e.g., internally generated thermal energy 102) to be thermally conducted about at least a portion of the periphery of battery cell 252 (e.g., in the directions of arrows 262, 264). The thermally-conductive surface (e.g., thermally-conductive surface 260) may include a thermally-conductive coating, examples of which may include but are limited to a thermally-conductive epoxy coating and a thermally-conductive metallic coating (e.g., a copper coating, an aluminum coating, or a gold coating). wherein such coatings may be applied to the surface of battery cell 252 to form thermally-conductive battery cell 250. For example, such a thermally-conductive epoxy coating and/or a thermally-conductive metallic coating may be sprayed onto and/or electrostatically applied to a surface of battery cell 252 to form thermally-conductive surface 260 that e.g., fully or partially encapsulates battery cell 252.

The battery cell (e.g., battery cell 252) may be thermally coupled to a battery cell thermal management assembly (e.g., battery cell thermal management assembly 100). As discussed above, battery cell thermal management assembly 100 may include a body structure (e.g., body structure 104) that includes a plurality of cell-shaped recesses (e.g., cell-shaped recesses 106) configured to receive a plurality of battery cells (e.g., battery cells 16). Battery cell thermal management assembly 100 may also include a thermal management passage (e.g., thermal management passage 112) positioned within the body structure (e.g., body structure 104) and configured to circulate a thermal management fluid (e.g., thermal management fluid 114) to extract internally-generated thermal energy (e.g., internally generated thermal energy 102) from the plurality of battery cells (e.g., battery cells 16, 110).

The above-described thermally-conductive coating (e.g., a thermally-conductive epoxy coating) that makes up the thermally-conductive surface 260 may be configured to bond the battery cell (e.g., battery cell 252) to the battery cell thermal management assembly (e.g., battery cell thermal management assembly 100).

In certain configurations, the portion of the periphery of the battery cell (e.g., battery cell 252) that includes thermally-conductive surface 260 may only include the portion of the periphery of the battery cell (e.g., battery cell 252) proximate the battery cell thermal management assembly (e.g., battery cell thermal management assembly 100). In other configurations, the portion of the periphery of the battery cell (e.g., battery cell 252) that includes thermally-conductive surface 260 may include the entire periphery of the battery cell (e.g., battery cell 252).

In the latter configuration, the internally-generated thermal energy (e.g., internally generated thermal energy 102) proximate the outer surface (e.g., outer surface 266) of thermally-conductive battery cell 250 may be extracted by having such thermal energy (e.g., internally generated thermal energy 102) conductively-travel along thermally-conductive surface 260 (in the direction of arrows 262, 264) so that battery cell thermal management assembly 100 may extract such thermal energy via thermal management fluid 114.

As discussed above, battery cell thermal management assembly 100 may also be utilized to actually provide heat to the plurality of battery cells (e.g., battery cells 16, 110). Specifically, the heat exchanger (e.g., heat exchanger 120) may be configured to introduce thermal energy into thermal management fluid (e.g., thermal management fluid 114), thus allowing thermal management fluid 114 and battery cell thermal management assembly 100 to warm the plurality of battery cells (e.g., battery cells 16, 110) to a desired operating temperature. Accordingly and in such a configuration, the above-described thermally-conductive surface 260 of thermally-conductive battery cell 250 may actually distribute thermal energy received from thermal management fluid 114 and battery cell thermal management assembly 100 about the periphery of thermally-conductive battery cell 250, thus enabling the unified warming of thermally-conductive battery cell 250.

General

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A battery cell thermal management assembly comprising:
   a body structure including a plurality of cell-shaped recesses configured to receive a plurality of battery cells;
   a thermal management passage positioned within the body structure and configured to circulate a thermal management fluid to extract internally-generated thermal energy from the plurality of battery cells; and
   a phase change material positioned within the body structure and configured to transfer the internally-generated thermal energy from the plurality of battery cells to the thermal management fluid.

2. The battery cell thermal management assembly of claim 1 wherein one or more of the plurality of cell-shaped recesses is configured to at least partially encapsulate one or more of the plurality of battery cells.

3. The battery cell thermal management assembly of claim 1 wherein one or more of the plurality of cell-shaped recesses is configured to fully encapsulate one or more of the plurality of battery cells.

4. The battery cell thermal management assembly of claim 1 wherein one or more of the plurality of cell-shaped recesses is a radiused trough configured to accommodate one or more cylindrical-shaped battery cells.

5. The battery cell thermal management assembly of claim 1 wherein one or more of the plurality of cell-shaped recesses is a flat-bottomed trough configured to accommodate one or more flat-bottomed battery cells.

6. The battery cell thermal management assembly of claim 1 wherein the thermal management passage includes one or more circulation tubes positioned within the body structure.

7. The battery cell thermal management assembly of claim 1 wherein the thermal management passage includes one or more circulation passages defined within the body structure.

8. The battery cell thermal management assembly of claim 1 wherein the thermal management passage is configured to interface with a fluid circulation system configured to circulate the thermal management fluid and extract the internally-generated thermal energy therefrom.

9. The battery cell thermal management assembly of claim 1 wherein the body structure is constructed of a thermally-conductive metallic material.

10. The battery cell thermal management assembly of claim 1 wherein the body structure is constructed of a thermally-conductive plastic material.

11. The battery cell thermal management assembly of claim 1 wherein the thermal management fluid includes one or more of: a glycol-based fluid, a water-based fluid, and a silicone-based fluid.

12. The battery cell thermal management assembly of claim 1 further comprising:
- a thermally-conductive material positioned within the body structure and configured to transfer the internally-generated thermal energy from the plurality of battery cells to the thermal management fluid.

* * * * *

(12) EX PARTE REEXAMINATION CERTIFICATE (12722nd)
United States Patent
Saul, II et al.

(10) Number: US 11,715,850 C1
(45) Certificate Issued: Oct. 1, 2024

(54) BATTERY THERMAL MANAGEMENT SYSTEM

(71) Applicant: Genovation Cars, Inc., Rockville, MD (US)

(72) Inventors: Andrew Maguire Saul, II, Rockville, MD (US); Robert Irby, III, Washington, DC (US); Steve Rogers, Sarasota, FL (US); Raymond A. Peters, White Lake, MI (US)

(73) Assignee: GENOVATION CARS, INC., Rockville, MD (US)

Reexamination Request:
No. 90/015,302, Sep. 25, 2023

Reexamination Certificate for:
Patent No.: 11,715,850
Issued: Aug. 1, 2023
Appl. No.: 17/697,589
Filed: Mar. 17, 2022

Related U.S. Application Data (60) Provisional application No. 63/162,296, filed on Mar. 17, 2021.

(51) Int. Cl.
| | | |
|---|---|---|
| *H01M 10/625* | (2014.01) |
| *B60L 50/64* | (2019.01) |
| *B60L 58/24* | (2019.01) |
| *B60L 58/26* | (2019.01) |
| *H01M 10/0525* | (2010.01) |
| *H01M 10/613* | (2014.01) |
| *H01M 10/653* | (2014.01) |
| *H01M 10/6551* | (2014.01) |
| *H01M 10/6556* | (2014.01) |
| *H01M 10/6568* | (2014.01) |
| *H01M 50/121* | (2021.01) |
| *H01M 50/124* | (2021.01) |
| *H01M 50/131* | (2021.01) |

(52) U.S. Cl.
CPC ........... *H01M 10/625* (2015.04); *B60L 50/64* (2019.02); *B60L 58/24* (2019.02); *B60L 58/26* (2019.02); *H01M 10/0525* (2013.01); *H01M 10/613* (2015.04); *H01M 10/653* (2015.04); *H01M 10/6551* (2015.04); *H01M 10/6556* (2015.04); *H01M 10/6568* (2015.04); *H01M 50/121* (2021.01); *H01M 50/1245* (2021.01); *H01M 50/131* (2021.01); *H01M 2220/20* (2013.01)

(58) Field of Classification Search
None
See application file for complete search history.

(56) References Cited

To view the complete listing of prior art documents cited during the proceeding for Reexamination Control Number 90/015,302, please refer to the USPTO's Patent Electronic System.

*Primary Examiner* — James A Menefee (57) ABSTRACT

A battery cell thermal management assembly includes: a body structure including a plurality of cell-shaped recesses configured to receive a plurality of battery cells; and a thermal management passage positioned within the body structure and configured to circulate a thermal management fluid to extract internally-generated thermal energy from the plurality of battery cells.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-12, dependent on an amended claim, are determined to be patentable.

New claims 13-14 are added and determined to be patentable.

1. A battery cell thermal management assembly comprising:
   a body structure including a plurality of cell-shaped recesses configured to receive a plurality of battery cells;
   a thermal management passage positioned within the body structure and configured to circulate a thermal management fluid to extract internally-generated thermal energy from the plurality of battery cells; and
   a phase change material positioned within the body structure and configured to transfer the internally-generated thermal energy from the plurality of battery cells to the thermal management fluid, *the phase change material filling gaps within the body structure between the body structure and the thermal management passage.*

13. *The battery cell thermal management assembly of claim 2 further comprising:*
    *a second body structure including a second plurality of cell-shaped recesses configured to partially encapsulate one or more of the plurality of battery cells;*
    *a second thermal management passage positioned within the second body structure and configured to circulate the thermal management fluid to extract internally-generated thermal energy from the plurality of battery cells; and*
    *a second phase change material positioned within the second body structure and configured to transfer the internally-generated thermal energy from the plurality of battery cells to the thermal management fluid, the second phase change material filling gaps within the second body structure between the second body structure and the second thermal management passage;*
    *wherein the body structure and the second body structure are configured to be positioned parallel to one another to fully encapsulate the plurality of battery cells therebetween.*

14. *A battery cell thermal management assembly comprising:*
    *a body structure including a plurality of cell-shaped recesses configured to receive a plurality of battery cells;*
    *a thermal management passage positioned within the body structure and configured to circulate a thermal management fluid to extract internally-generated thermal energy from the plurality of battery cells, wherein the thermal management passage extends along the plurality of cell-shaped recesses generally perpendicular to a length of each of the plurality of battery cells adjacent a region of the plurality of cell-shaped recesses corresponding to a sidewall portion of the plurality of battery cells; and*
    *a phase change material positioned within the body structure and configured to transfer the internally-generated thermal energy from the plurality of battery cells to the thermal management fluid, the phase change material filling gaps within the body structure between the body structure and the thermal management passage.*

\* \* \* \* \*